United States Patent
Kim et al.

(10) Patent No.: US 7,212,691 B2
(45) Date of Patent: May 1, 2007

(54) POLARIZATION-SHAPED DUOBINARY OPTICAL TRANSMISSION APPARATUS

(75) Inventors: Hoon Kim, Suwon-shi (KR);
Seong-Taek Hwang, Pyeongtaek-shi (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 310 days.

(21) Appl. No.: 10/719,502

(22) Filed: Nov. 21, 2003

(65) Prior Publication Data
US 2004/0252929 A1  Dec. 16, 2004

(30) Foreign Application Priority Data
Jun. 10, 2003  (KR) .................... 10-2003-0037007

(51) Int. Cl.
*G02B 6/26* (2006.01)
*G02F 1/01* (2006.01)

(52) U.S. Cl. .................... 385/1; 385/3; 385/39

(58) Field of Classification Search ........... 385/1–9, 385/39; 398/75, 152, 98, 184, 188, 181
See application file for complete search history.

(56) References Cited

U.S. PATENT DOCUMENTS

| | | | | |
|---|---|---|---|---|
| 6,097,525 | A * | 8/2000 | Ono et al. ............... | 398/185 |
| 6,629,121 | B1 * | 9/2003 | Ishikawa et al. ........... | 708/815 |
| 6,650,846 | B1 * | 11/2003 | Ito ........................ | 398/184 |
| 6,934,308 | B1 * | 8/2005 | Yonenaga et al. .......... | 370/535 |
| 2003/0025971 | A1 * | 2/2003 | Price et al. ................ | 359/181 |
| 2003/0165341 | A1 * | 9/2003 | Bulow ...................... | 398/75 |
| 2004/0151511 | A1 * | 8/2004 | Gill et al. ................. | 398/183 |
| 2004/0151512 | A1 * | 8/2004 | Gill et al. ................. | 398/183 |
| 2004/0228635 | A1 * | 11/2004 | Price ........................ | 398/149 |

FOREIGN PATENT DOCUMENTS

| | | |
|---|---|---|
| DE | 3324597 A1 | 7/1983 |
| EP | 0825733 A2 | 2/1998 |
| EP | 0825733 A2 | 2/1998 |
| EP | 0833177 A1 | 4/1998 |
| EP | 0877477 A2 | 11/1998 |
| EP | 0877477 A2 | 11/1998 |
| EP | 0964538 A2 | 12/1999 |
| EP | 0964538 A2 | 12/1999 |

OTHER PUBLICATIONS

"Dispersion-Tolerant Transmission Using a Duobinary Polarization-Shift Keying Transmission Scheme;" A. Shamim Siddiqui et al.; XP-001123175; IEEE Photonics Technology Letters; vol. 14, No. 2; Feb. 2002; 3 pages.

"Dispersion-Tolerant Transmisson Using a Duobinary Polarization-Shift Keying Transmission Scheme;" A. Shamim Siddiqui et al.; IEEE Photonics Technology Letters, vol. 14, No. 2; Feb. 2002; 3 pages.

"Reduced Complexity Optical Duobinary 10-Gb/s Transmitter Setup Resulting in an Increased Transmission Distanct;" W. Kaiser et al.; IEEE Photonics Technology Letters, vol. 13, No. 8; Aug. 2001; 3 pages.

\* cited by examiner

*Primary Examiner*—Kevin S. Wood
(74) *Attorney, Agent, or Firm*—Cha & Reiter, LLC

(57) ABSTRACT

A polarization-shaped duobinary optical transmission apparatus is disclosed. The apparatus includes a light source that generates light having a continuous wave, an optical intensity modulator that converts the light into an optical intensity signal based upon an input electric signal and a differential encoder that encodes the input electric signal. The apparatus also includes a delay element that delays the encoded electric signal and a polarization-shaped modulator that polarization-modulates the signal modulated optical intensity by using the delayed signal.

13 Claims, 9 Drawing Sheets

POLARIZATION-SHAPED DUOBINARY OPTICAL TRANSMISSION APPARATUS

CLAIM OF PRIORITY

This application claims priority to an application entitled "Polarization-shaped duobinary optical transmission apparatus," filed in the Korean Intellectual Property Office on Jun. 10, 2003 and assigned Ser. No. 2003-37007, the contents of which are hereby incorporated by reference.

BACKGROUND OF THE INVENTION

1. Field of the Invention

The present invention relates to an optical transmission apparatus for an optical communication system, and more particularly to a polarization-shaped duobinary optical transmission apparatus using a polarization-shaped duobinary optical transmission scheme.

2. Description of the Related Art

In general, a DWDM (Dense Wavelength Division Multiplexing) optical transmission system can transmit an optical signal having multiple channels with different wavelengths through a single optical fiber. Such DWDM systems can also transmit the optical signal regardless of transmission speed. Because of this, such DWDM systems are widely used in ultra-high speed Internet networks. In this regard, systems using the DWDM technology can transmit more than a hundred channels through a single optical fiber.

However, the enlargement of transmission capacity is restricted due to severe interference and distortion between channels if the channel distance is less than 50 GHz when a optical intensity is modulated using the conventional non-return-to-zero (NRZ) method. This is due to a rapid increase of data traffic and a request for high-speed transmission of data of more than 40 Gbps. Transmission distance is restricted in high-speed transmission of more than 10 Gbps since a direct current (DC) frequency component of a conventional binary NRZ transmission signal and a high frequency component spread during modulation cause non-linearity and dispersion when the binary NRZ transmission signal propagates in an optical fiber medium.

Optical duobinary technology has been highlighted as an optical transmission technology capable of overcoming restriction of transmission distance due to chromatic dispersion. A main advantage of the duobinary transmission is that the transmission spectrum is reduced in comparison to the general binary transmission. In a dispersion restriction system, the transmission distance is in inverse proportion to the square of the transmission spectrum bandwidth. This means that, when the transmission spectrum is reduced by ½, the transmission distance increases four times. Furthermore, since a carrier frequency is suppressed in a duobinary transmission spectrum, it is possible to relax the restriction of an optical power output caused by Brillouin scattering excited in the optical fiber.

In this regard, polarization-shaped duobinary modulation schemes have a characteristic which is strong with respect to narrow signal bandwidths and nonlinear distortion of optical fibers. An optical signal having intensities of '1' level and '0' level as shown in FIG. 1, in which '1' level represents an optical signal having two orthogonal polarization-shaped intensities ($1_\perp$ or $1_\parallel$) and '0' level represents an optical signal having an intensity of zero, an ideal optical intensity. However, since the optical intensity of polarization-shaped duobinary is characterized by the binary, '1' and '0', its receiver is employed without modifying a receiver of a typical optical transmission system having OOK (on-off keying) mode.

A characteristic of the polarization-shaped duobinary signal is an narrow bandwidth that is powerful against nonlinear distortion of optical fiber signal. The bandwidth of the polarization-shaped duobinary signal is narrower than that of a typical OOK (on-off keying) signal or AM-PSK duobinary signal so that the polarization-shaped duobinary contributes to improving the frequency efficiency of DWDM optical transmission systems. Also, since the polarization-shaped duobinary signal include '1' level bits which comprises orthogonal polarization-shaped bits, the polarization-shaped duobinary signal is different from the OOK (on-off keying) signal or AM-PSK duobinary signal, and so are powerful against an nonlinear distortion of optical fiber.

FIG. 2, illustrates a structure of a conventional duobinary optical transmitter. First, a binary NRZ input data signal is input to and coded by a differential encoder 1. Generally, since an optical modulator signal and an input received signal are different, a duobinary transmitter encodes the input data signal using a differential encoder 1 in a transmission section so that the received signal and transmission data are the same. The encoded signal is split into two, one is directly input to a first duobinary filter 2, the other is input to a second duobinary filter 4 through an inverter 3. Duobinary filters 2 and 4 are narrow band filters having a bandwidth corresponding to about ¼ transmission speed (transmission speed by 0.25). The binary signal input to those filters is converted into a ternary signal, '+1', '0', and '−1' level signal,. Half-wave rectifiers 5 and 8 pass a positive signal and convert a negative signal into zero. The ternary signal passing through the half-wave rectifier 5 is a binary signal having '+1' and '0' level, because '−1' level converts into '0' level. An output signal from the half-wave rectifier 5 is input to an optical intensity modulator 7 through an optical modulator driver 6. An inverted signal by an inverter 3 is input to other optical intensity modulator 10 through the half-wave rectifier 8 and an optical modulator driver 9. A light having continuous wave from a laser diode is split into two polarization beams having orthogonality to each other by an orthogonal polarization beam splitter 12. Each of two polarization beams is input to respective optical intensity modulators 7 and 10 and is synthesized by a polarization-maintaining coupler 13.

However, such conventional duobinary optical transmitters have several shortcomings. First, since the conventional duobinary optical transmitter has a (up and down) symmetrical structure, as shown in FIG. 1, duobinary filters, half-rectifiers, optical modulator drivers, and optical intensity modulators, except a differential encoder, an inverter and a polarization beam splitter, are allocated by two in the conventional duobinary optical transmitter. Therefore, the conventional duobinary optical transmitter requires a plurality of electric elements so that its implementation cost is very high. Secondly, since the (up and down) symmetrical structure of the conventional duobinary optical transmitter requires the symmetrical structure of electric/optical elements, reliability and reproducibility of its implementation are degraded. Lastly, because of deterioration of half-rectifiers in the conventional optical transmitter, such as that shown FIG. 2, '1' bit polarization orthogonality dwindles, and as a result, the tolerance of an optical fiber nonlinear characteristic weakens.

SUMMARY OF THE INVENTION

One object of the present invention is to provide a polarization-shaped duobinary optical transmitter which can diminish its implementation cost resulting from decreasing the complexity of its structure.

Another object of the present invention is to provide a polarization-shaped duobinary optical transmitter, which can improve its reliability by removing or relaxing requirements for electric elements' symmetrical structure resulting from the symmetrical structure of the conventional polarization-shaped duobinary optical transmitter.

One embodiment of the present invention is directed to a polarization-shaped duobinary optical transmission apparatus including a light source which generates light having continuous wave, an optical intensity modulator which converts the light having continuous wave into an optical intensity signal by an inputted electric signal, a differential encoder which encodes the inputted electric signal, a delay element which delays the encoded electric signal by a half-bit and a polarization-shaped modulator which polarization-modulates the signal modulated optical intensity by using the signal delayed by a half-bit.

In another embodiment, the optical intensity modulator is a single-armed X-cut interferometer type optical intensity modulator or a dual-armed Z-cut interferometer type optical intensity modulator.

Yet another embodiment is directed to a polarization-shaped duobinary optical transmission apparatus including a light source which generates light having continuous wave, an optical intensity modulator which converts the light having continuous wave into an optical intensity signal by an inputted electric signal, a differential encoder which encodes the inputted electric signal, a duobinary filter which converts the encoded 2-level electric signal into a 3-level electric signal and a polarization-shaped modulator which polarization-modulates the signal modulated an optical intensity by using the electric signal converted by a 3-level.

In a different embodiment, a polarization-shaped duobinary optical transmission apparatus includes a differential encoder which encodes an input electric signal, a duobinary filter which converts the encoded 2-level electric signal into a 3-level signal, a light source which generates light having continuous wave, a polarizer which adjusts a polarization of the light having continuous wave and a Mach-Zehnder modulator which receives first and second separated light inputted from the polarizer. The Mach-Zehnder modulator includes an upper arm and a lower arm. The upper arm modulates the polarization of the first separated light by means of the 3-level duobinary signal inputted from the duobinary filter. The lower arm adjusts the phase of the second separated light and the apparatus also includes a faraday rotator which matches a polarization axis of the light inputted to the lower arm of the Mach-Zehnder modulator with an electro-optic effect axis of the Mach-Zehnder modulator.

In one embodiment, the polarizer is slanted 45 degrees with respect to an electro-optic effect axis of the Mach-Zehnder modulator.

In another embodiment, the duobinary filter includes a low pass filter having a bandwidth smaller than that of the inputted electric signal.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein will be omitted when it may obscure the subject matter of the present invention.

Figure 1:
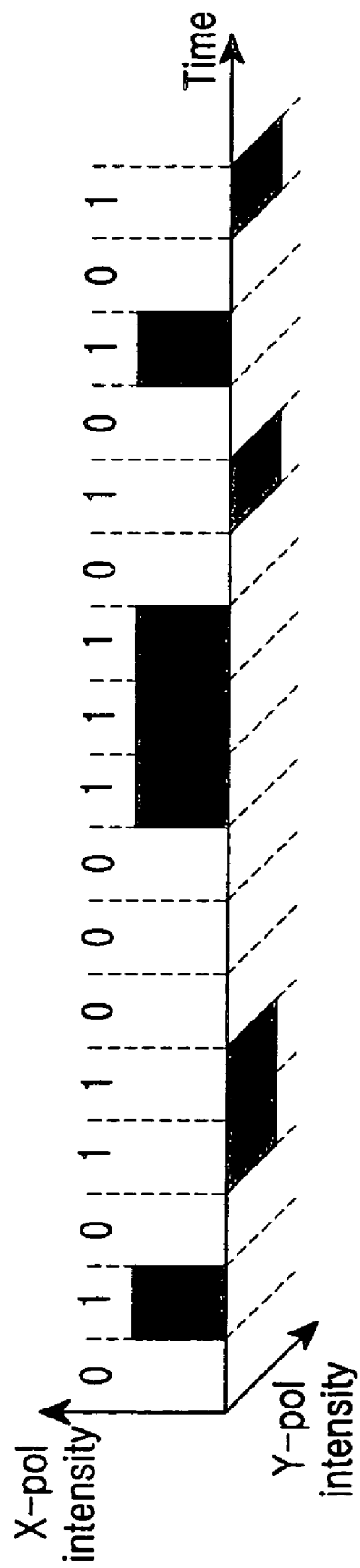
FIG. 1 shows an output characteristic of a polarization-shaped duobinary signal.
Figure 2:
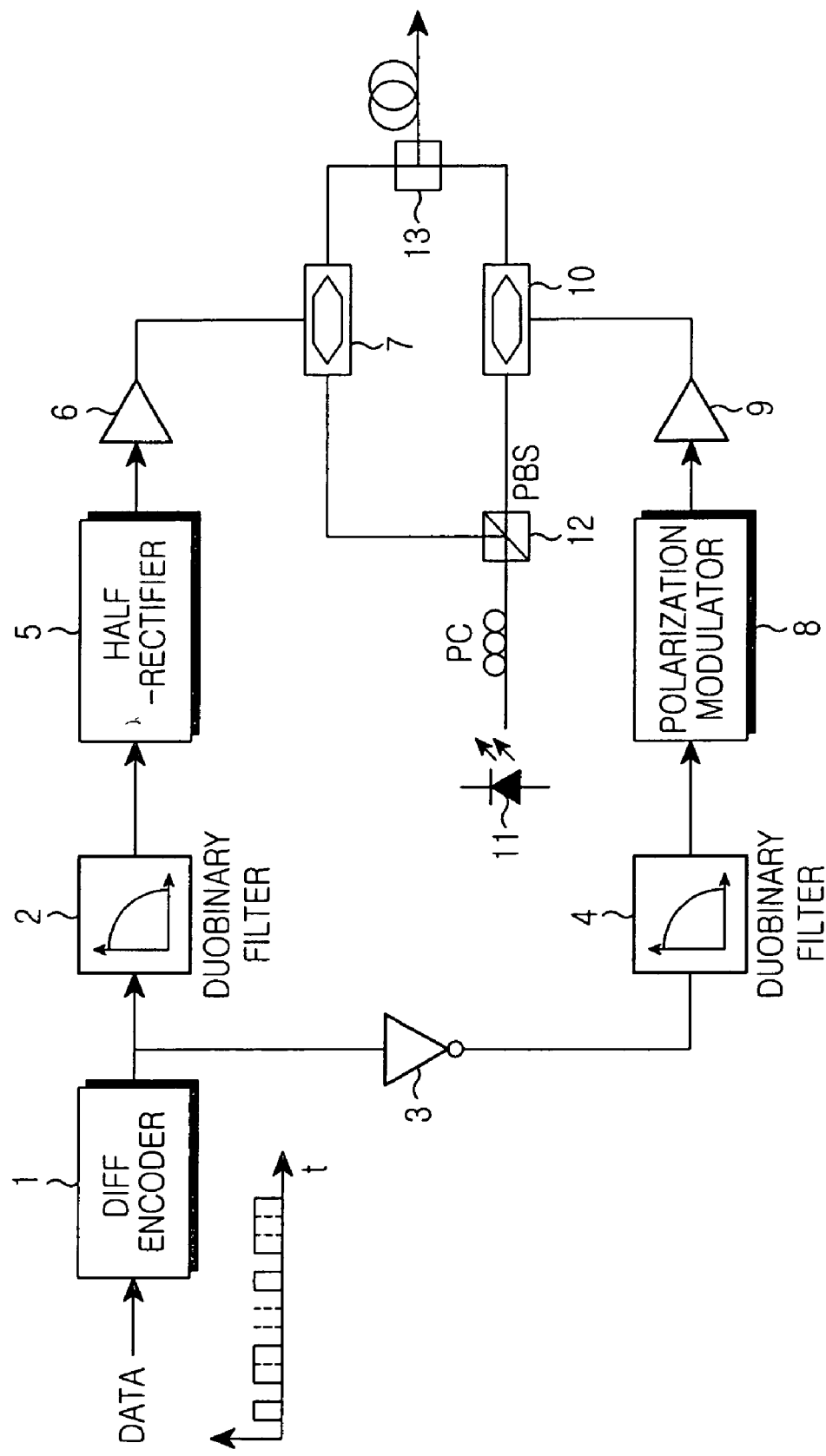
FIG. 2 illustrates an example of a conventional duobinary optical transmitter.
Figure 3:
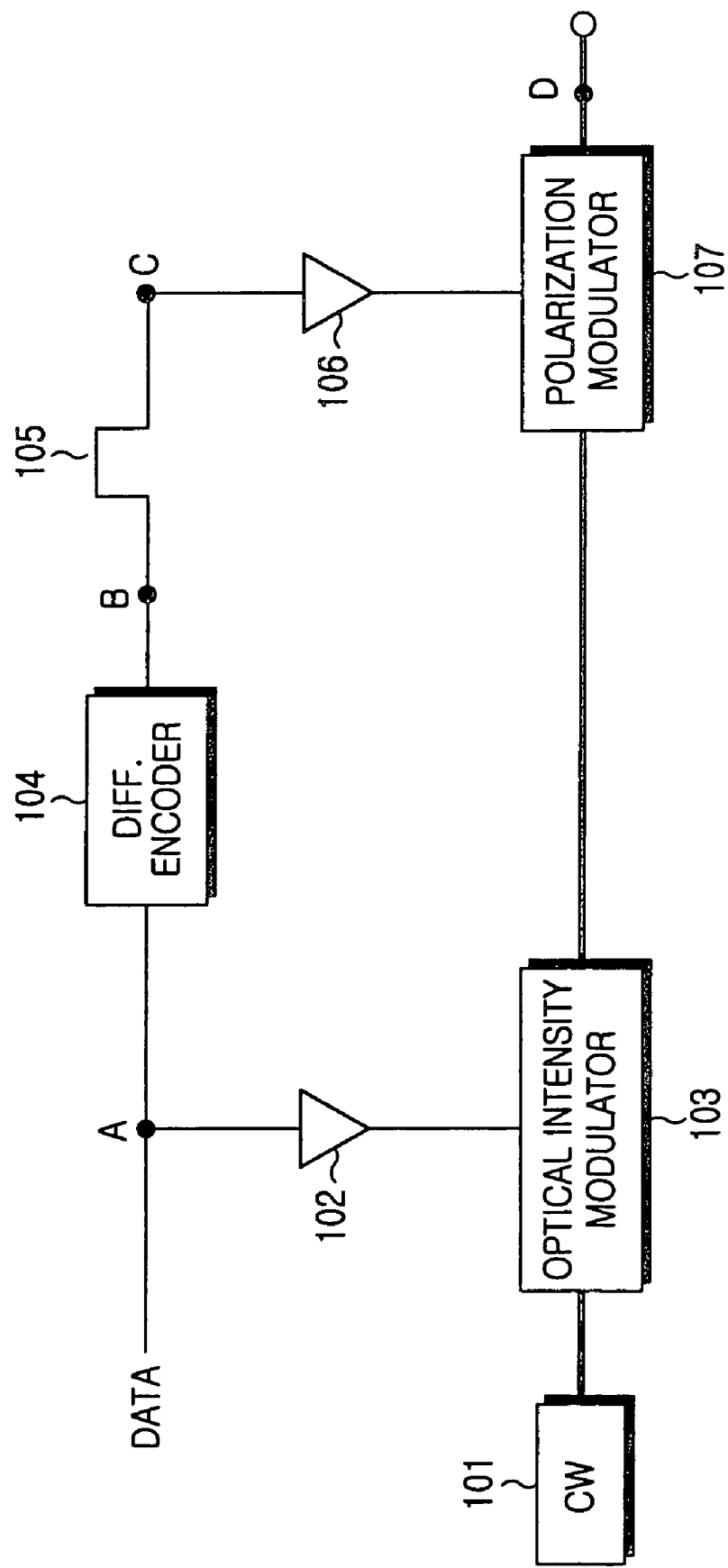
FIG. 3 illustrates a structure of a polarization-shaped duobinary optical transmission apparatus according to a first embodiment of the present invention.
Figure 4:
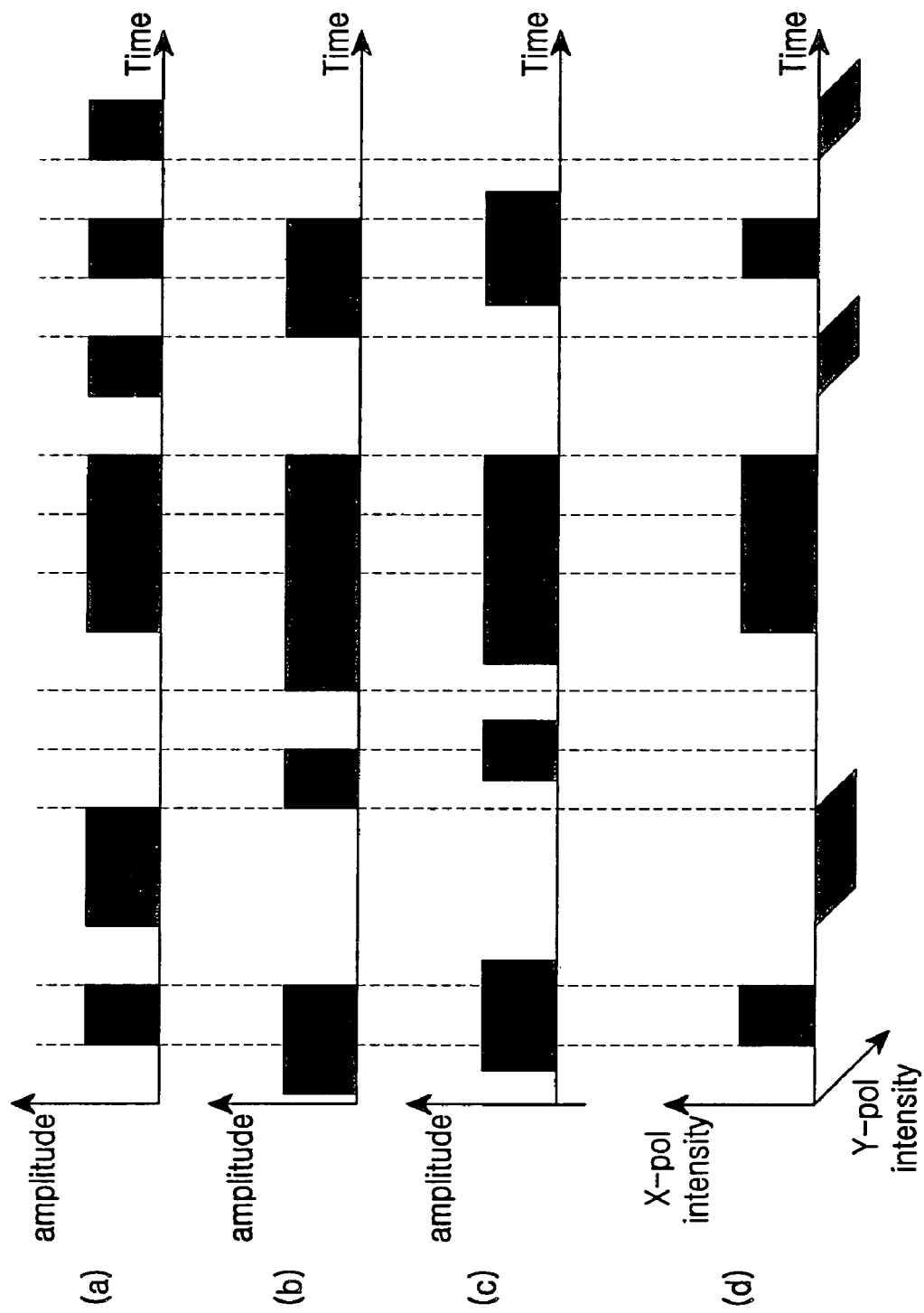
FIG. 4 illustrates forms of a signal at nodes A, B, C and D in FIG. 3.

FIG. 3 illustrates the structure of a polarization-shaped duobinary optical transmission apparatus according to a first embodiment of the present invention, and FIG. 4 illustrates signal forms at nodes A, B, C and D in FIG. 3.

With reference to FIG. 3, the polarization-shaped duobinary optical transmission apparatus includes a light source 101, which generates light having a continuous wave, an optical intensity modulator 103, which converts the light having the continuous wave into an optical intensity signal by an input electric signal, a differential encoder 104, which encodes the input electric signal, a half-bit delay element 105, which delays a 2-level electric signal by a half-bit, and polarization modulator 107, which polarization-modulates the 2-level electric signal delayed by a half-bit. Also, the polarization-shaped duobinary optical transmission apparatus includes modulator operation amplifiers 102 and 106.

The light source 101 may be, for example, a laser diode.

The optical intensity modulator 103 converts the light from the light source 101 into the optical intensity signal by an input modulator operation signal. The optical intensity modulator 103 may be, for example, a single-armed X-cut interferometer type optical intensity modulator or a dual-armed Z-cut interferometer type optical intensity modulator.

The differential encoder 104 encodes the inputted 2-level NRZ data. It can be composed of, for example, a 1-bit delay element and an exclusive-OR gate.

The half-bit delay element 105 delays a transmission time by a half-bit.

The polarization modulator 107 polarization-modulates the signal converted optical intensity by using an input electric signal. If a signal is passed through the half-bit delay element 105 and the modulator operation amplifier 106 and a peak-to-peak value of the signal is regulated as $V_\pi$ then '+1' and '0' level signal portions of the signal are modulated into an optical signal having orthogonality to each other by the polarization modulator 107, in which $V_\pi$ is a voltage value required in order to modulate the phase of the signal into 180 degrees in the polarization modulator 107.

Now, the operation of the polarization-shaped duobinary optical transmission apparatus will be described according to an embodiment of the present invention having the above components.

With reference to FIGS. 3 and 4, after the 2-level NRZ data, as described in FIG. 4a, is split into two signals, a first signal is input as an operation signal of the optical intensity modulator 103 through the modulator operation amplifier 102, a second signal is input to the differential encoder 104. The light from the light source 101 is input to the optical intensity modulator 103 and is converted into the same optical intensity signal by the electric signal from the modulator operation amplifier 102. The first signal input to the differential encoder 104 is encoded as a signal of FIG. 4b, and is input to the half-bit delay element 105 (FIG. 4c). If a signal is passed through the half-bit delay element 105 and the modulator operation amplifier 106 and a peak-to-peak value of the signal is regulated as $V_\pi$ of the polarization modulator 107, then '+1' and '0' level signal portions of the signal are modulated into optical signal having orthogonality to each other by polarization modulator 107, in which $V_\pi$ is a voltage value required in order to modulate the phase of the signal into 180 degrees in the polarization modulator 107. FIG. 4d shows an optical signal having passed through the polarization modulator 107, in which '1' bit of the optical signal includes optical signal portions having orthogonality to each other, which is a characteristic of a polarization-shaped duobinary signal.

Figure 5:
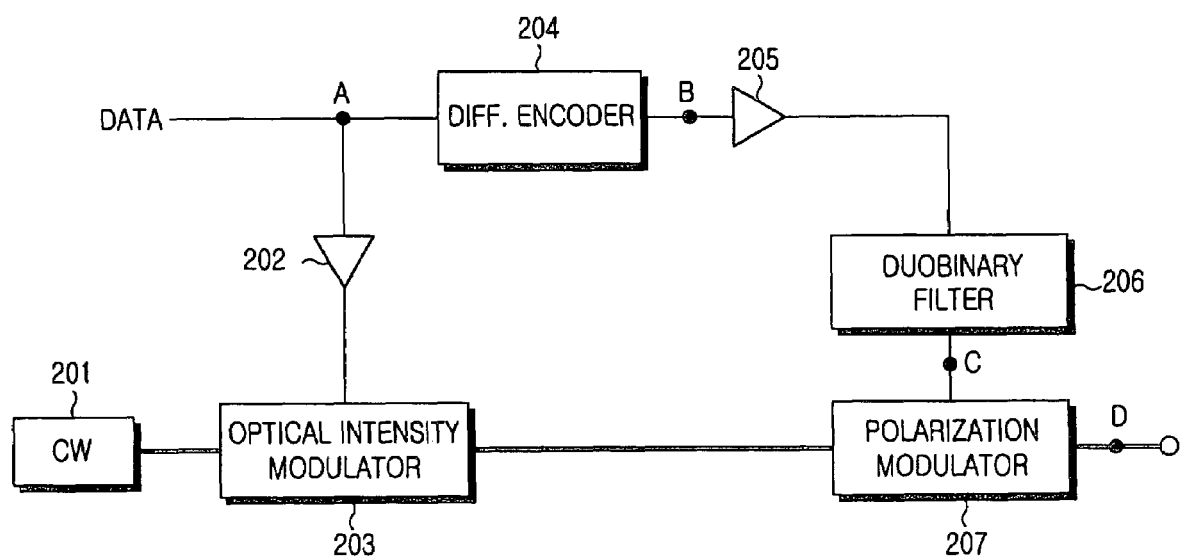
FIG. 5 illustrates a structure of a polarization-shaped duobinary optical transmission apparatus according to a second embodiment of the present invention.
Figure 6:
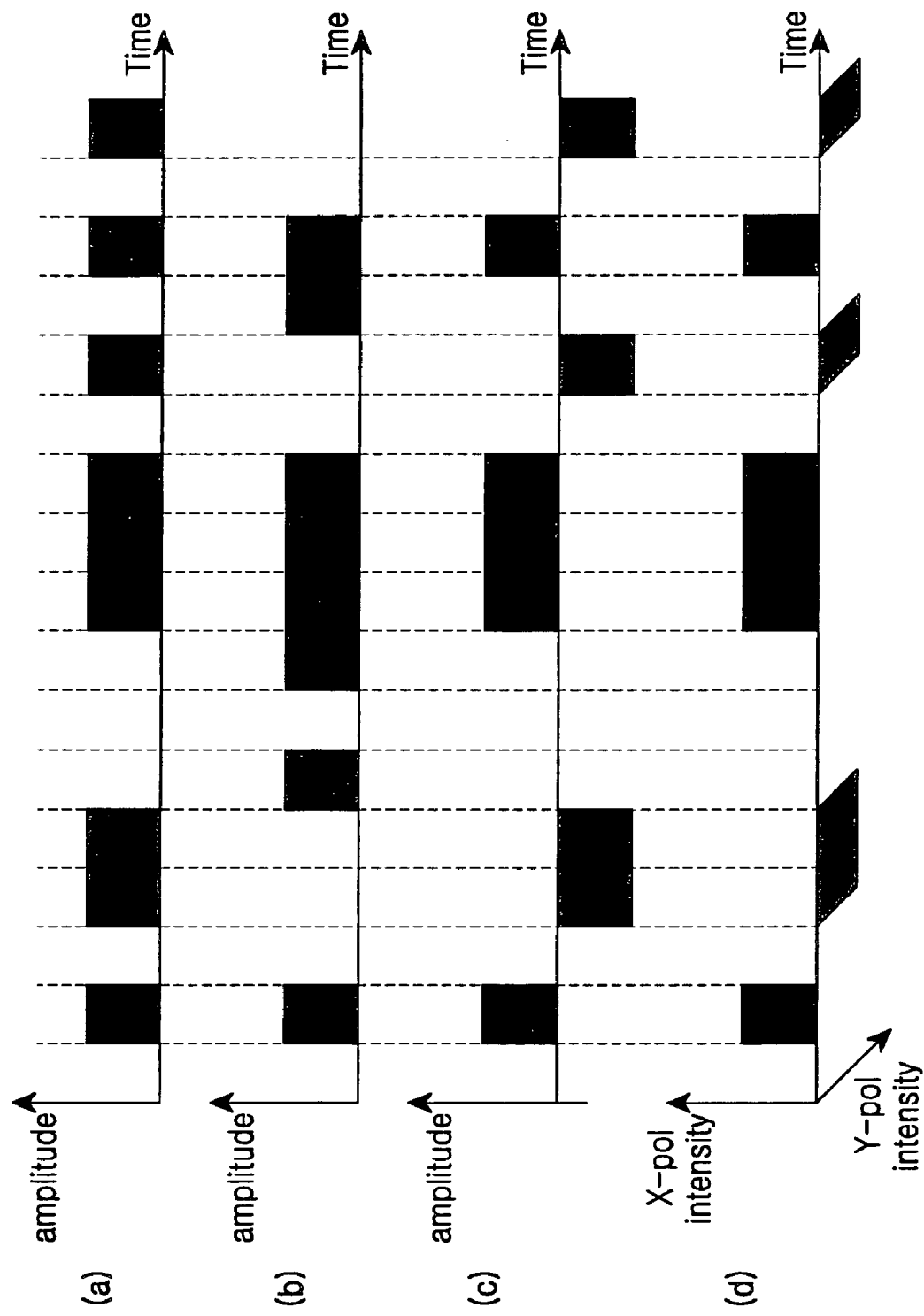
FIG. 6 illustrates forms of a signal at nodes A, B, C and D in FIG. 5.

FIG. 5 illustrates the structure of a polarization-shaped duobinary optical transmission apparatus according to a second embodiment of the present invention, and a, b, c and d in FIG. 6 illustrate forms of a signal at nodes A, B, C and D in FIG. 5.

With reference to FIG. 5, the polarization-shaped duobinary optical transmission apparatus includes a light source 201, which generates light having a continuous wave, an optical intensity modulator 203, which modulates the light having the continuous wave into an optical intensity signal by an input electric signal, a differential encoder 204, which encodes the input electric signal, a duobinary filter 206, which converts the encoded 2-level electric signal into a 3-level electric signal and a polarization modulator 207, which polarization-modulates the signal modulated optical intensity by means of the electric signal converted into a 3-level signal. Also, the polarization-shaped duobinary optical transmission apparatus includes modulator operation amplifiers 202 and 206. The modulator operation amplifiers 202 and 206 output a signal in order to make the optical intensity modulator 203 and the duobinary filter 206 operate, respectively. This embodiment is different from the first in that it includes the duobinary filter 206 taking the place of an electric element delayed by a half-bit of the first embodiment. The following will only described the differences in order to avoid repetition.

The duobinary filter 206 is a low pass filter having a bandwidth corresponding to about ¼ data transmission speed (~0.25 transmission speed). The filter 206 converts the input 2-level signal into the 3-level signal having three logical level, '+1', '0', '−1',.

Now, the operation of the duobinary filter 206 according to the second embodiment of the present invention comprising the above components will be described.

With reference FIGS. 5 and 6, after the 2-level NRZ data, as described in FIG. 6a, are split into two signals, a first signal is input as an operation signal of the optical intensity modulator 203 through the modulator operation amplifier 202, a second signal is input to the differential encoder 204. The light from the light source 201 is input to the optical intensity modulator 203 and is converted into the same optical intensity signal by the electric signal output from the modulator operation amplifier 202. The first signal input to the differential encoder 204 is encoded as a signal form of FIG. 6b and is input to the duobinary filter 206 through the modulator operation amplifier 205. The duobinary filter 206 is a low pass filter having a bandwidth corresponding to about ¼ data transmission speed (~0.25 transmission speed). The duobinary filter 206 converts an input binary signal into a duobinary signal having three logical level, +1, 0, −1. In this way, the 2-level signal (FIG. 6c) is converted into the 3-level signal through the duobinary filter 206 (FIG. 6c). If a peak-to-peak value of the 3-level signal passed through the duobinary filter 206 is regulated as $V_\pi$ of the polarization modulator 207, then '+1' and '−1' level signal portions of the duobinary signal passed through the duobinary filter 206 are modulated into an optical signal having orthogonality to each other by polarization modulator 207, in which $V_\pi$ is a voltage value required in order to modulate the phase of the signal into 180 degrees in the polarization modulator 207. FIG. 6d shows an optical signal having passed through the polarization modulator 207, in which '1' bit of the optical signal includes optical signal portions having orthogonality to each other, which is a characteristic of a polarization-shaped duobinary signal.

Figure 7:
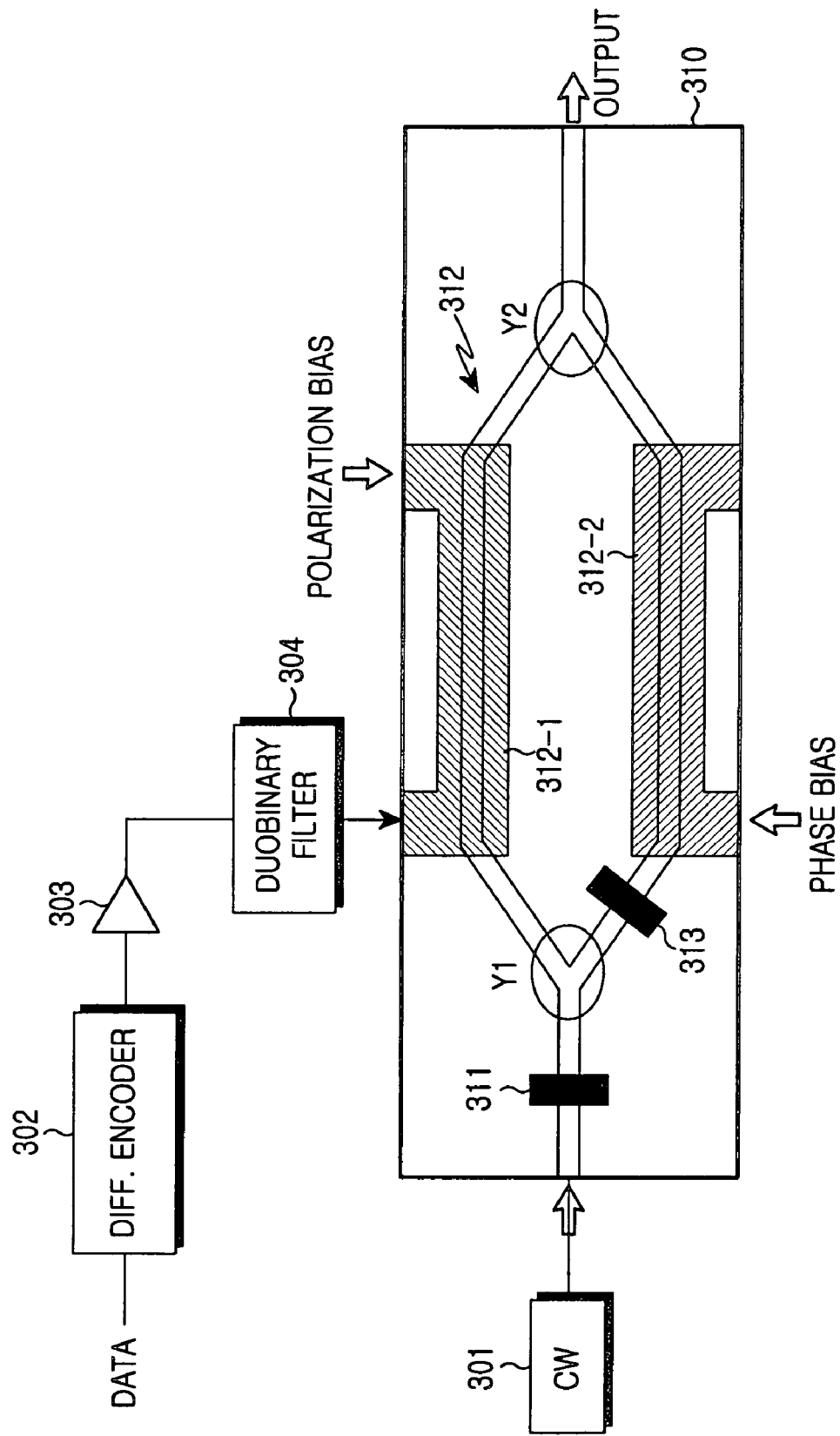
FIG. 7 illustrates a structure of a polarization-shaped duobinary optical transmission apparatus according to a third embodiment of the present invention.

FIG. 7 illustrates the structure of a polarization-shaped duobinary optical transmission apparatus according to a third embodiment of the present invention. This embodiment is using a Mach-Zehnder modulator.

With reference to FIG. 7, a polarization-shaped duobinary optical transmission apparatus, includes a light source 301, a differential encoder 302, an operation amplifier 303, a duobinary filter 304 and an optical modulator 310.

The light source 301 generates light having a continuous wave and may be, for example, a laser diode.

The differential encoder 302 encodes an input 2-level NRZ data and may be, for example, a power splitter, a 1-bit delay element and a power combiner.

The duobinary filter 304 is a low pass filter having a bandwidth corresponding to about ¼ data transmission speed (~0.25 transmission speed). This filter 304 converts the inputted 2-level signal into a 3-level signal having three logical level, +1, 0, −1,.

The optical modulator 310 includes a polarizer 311, a Mach-Zehnder modulator 312 and a Faraday rotator 313.

The Mach-Zehnder modulator 312 has a dual-armed Z-cut type. The Mach-Zehnder modulator 312 may be, for example, implemented using a $LiNbO_3$, a polymer or so forth, in an optical communication.

The polarizer 311 is slanted 45 degrees with respect to an electro-optic effect axis of the Mach-Zehnder modulator 312. As shown in FIG. 7, the polarizer 311 can be aligned inside or outside of an $LiNbO_3$ or polymer waveguide.

Figure 8:
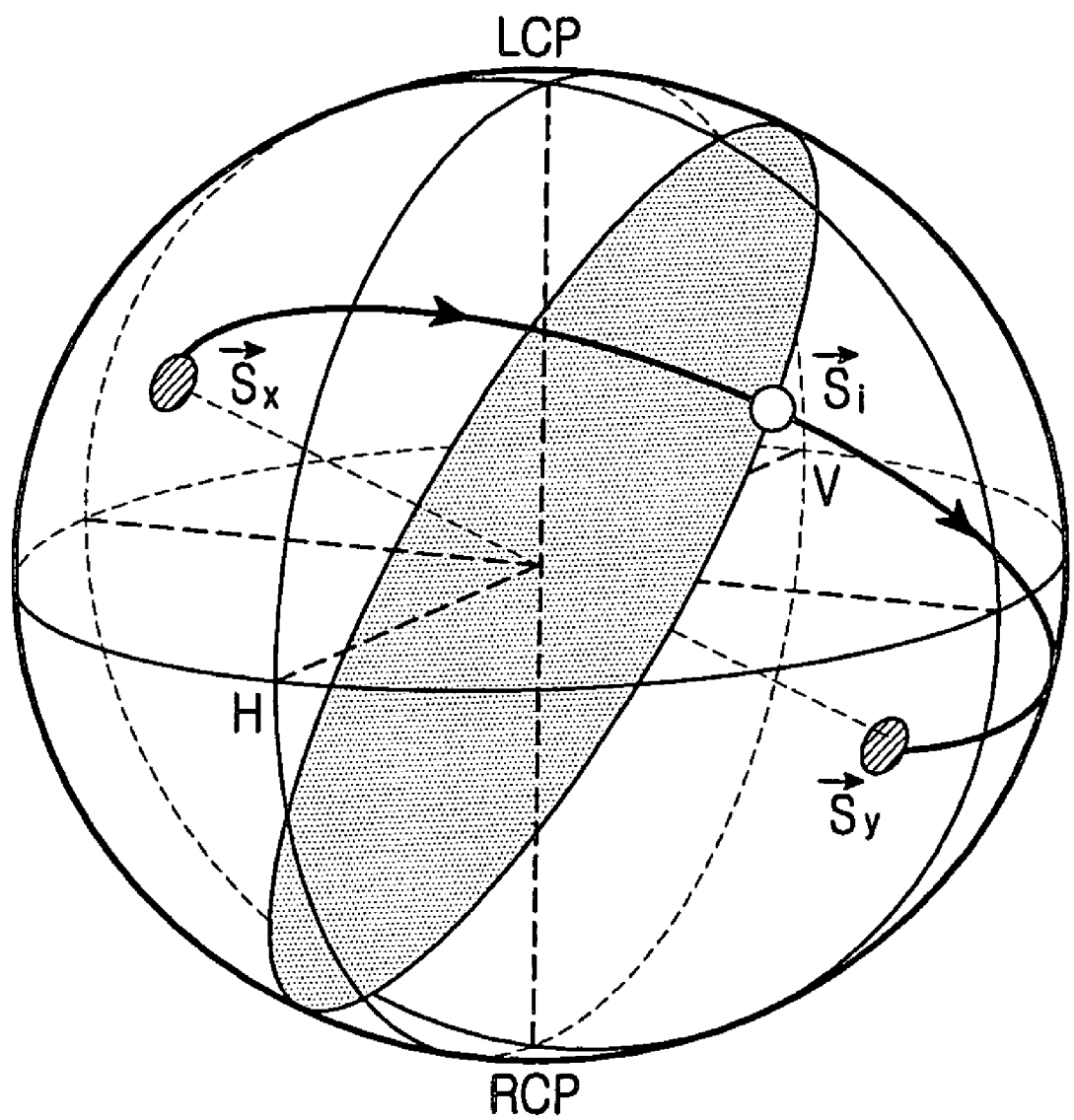
FIG. 8 illustrates polarization states of signals on a spherical surface of the Poincare.
Figure 9:
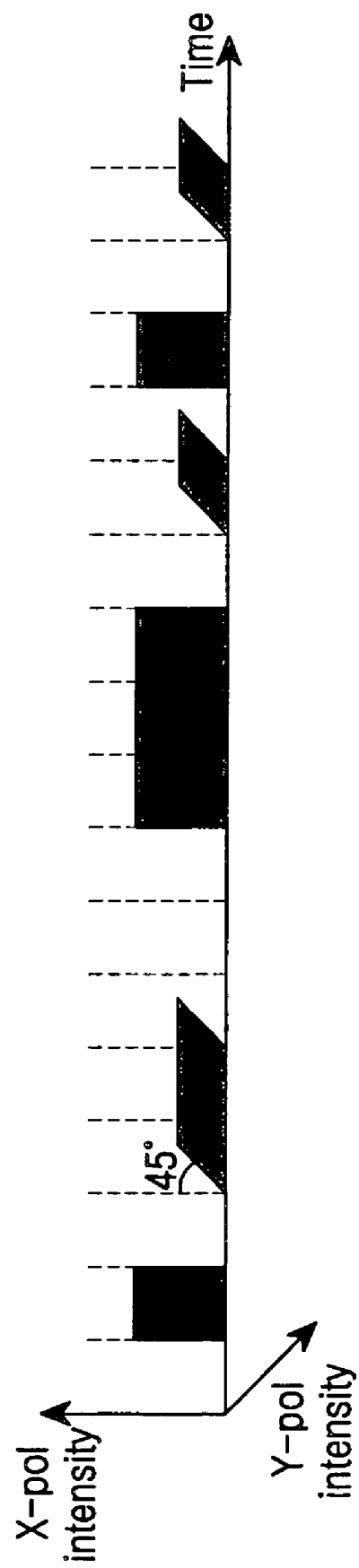
FIG. 9 illustrates an output wave form from an optical transmission apparatus.

Now, the operation of the polarization-shaped duobinary optical transmission apparatus comprising the above components as shown in FIGS. 7 to 9 will be described. FIG. 8 illustrates polarization states of signals on a spherical surface of the Poincare. FIG. 9 illustrates output wave form from an optical transmission apparatus.

With reference to FIG. 7, the light from the laser diode 301 is incident on the Mach-Zehnder modulator 312 through the polarizer 311. The incident light on the Mach-Zehnder modulator 312 is split at a first Y-branch (Y2) and travels through an upper arm 312-1 and a lower arm 312-1. First, the split light traveling through the upper arm 312-1 is polarization-modulated by electro-optic effect. An electric signal input to the upper arm 312-1 is a 3-level duobinary signal. The 3-level duobinary signal is generated through the differential filter 302, the operation amplifier 302 and the duobinary filter 304. When the duobinary signal is incident on the upper arm 312-1 with an amplitude value, $V_\pi$, the 3-level duobinary signal is modulated into a duobinary polarization-shift keying having three polarization states, $S_X$, $S_I$ and $S_Y$, in which $S_X$, $S_Y$ have orthogonality to each other and $V_\pi$ is a voltage amplitude intensity required in order to modulate the phase of the signal into 180 degrees in the polarization modulator.

The incident light on the lower arm 312-2 travels through an waveguide located at the lower arm 312-2, after a polarization axis of the incident light is at one with an electro-optic effect axis of the waveguide by the Faraday rotator 313. The lower arm 312-2 adjusts a phase bias of the Mach-Zehnder modulator 312 as null point. The light traveling through the upper arm 312-1 and the lower arm 312-2 are synthesized again at a second Y-branch (Y2). Generally, attributes of the synthesized light depend on relative polarization, an amplitude intensity and phase state of the light. For example, if the light on the Y-branch is split and synthesized in the ideal ratio of 50 to 50, amplitude intensities of light on two different branches are the same, and so the attribute of the synthesized light is determined by only the relative polarization and phase state of light. In a case where the polarization state of $S_I$ is matched, an electro-optic effect axis of the Mach-Zehnder modulator 312 by applying DC bias to the upper arm 312-1 (namely, the $S_I$ polarization states of the upper arm 312-1 and the lower arm 312-2 are the same), the light having $S_I$ polarization state through the upper arm 312-1 and the light through the lower arm 312-2 are canceled at the Y-branch combination. Thus, because the phase bias of the lower arm 312-2 is adjusted, the canceling between the light of the upper arm 312-1 and lower arm 312-2 is generated. In contrast, the light having $S_X$ or $S_Y$ polarization state of the upper arm 312-1 is combined with the light having $S_I$ polarization state of the lower arm 312-2. In this case, however, the canceling doesn't occur between them, because they have polarization states different from each other. Accordingly, the polarization state generating the canceling is not $S_X$ or $S_Y$ but $S_I$ from among the states generated by a signal input to the upper arm 312-1. Therefore, a form of an optical signal after the optical modulator 310 is a polarization duobinary signal as shown in FIG. 9. Also, when $S_X$ and $S_Y$ are orthogonal polarization states to each other in the optical modulator 310, an angle between $S_X$ and $S_Y$ becomes 45 degrees after the optical modulator 310 as shown in FIG. 9.

As described in the embodiments above, polarization-shaped duobinary optical transmission apparatus, largely minimizes the types and the number of electric elements required in a conventional polarization-shaped duobinary optical transmission apparatus, such as a duobinary filter, so that its implementation cost can be lowered.

Also, transmission apparatus according to aspects of the present invention remove radically symmetrical requirements of many electric elements not by employing the symmetrical structure of a conventional optical transmitter, so that reliability and implementation repetition of the transmission apparatus are improved.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An optical transmission apparatus comprising:
   a light source that generates light having a continuous wave;
   an optical intensity modulator that converts the light having continuous wave into an optical intensity signal based upon an input electric signal;
   a differential encoder that encodes the input electric signal;
   a duobinary filter that converts the encoded 2-level electric signal into a 3-level electric signal; and
   a polarization-shaped modulator that polarization-modulates the optical intensity signal by using the electric signal converted by a 3-level.

2. An optical transmission apparatus as claimed in claim 1, further comprising at least two operation amplifiers that drive the optical intensity modulator and the duobinary filter, respectively.

3. An optical transmission apparatus as claimed in claim 1, wherein the optical intensity modulator comprises a single-armed X-cut interferometer type optical intensity modulator.

4. An optical transmission apparatus as claimed in claim 1, wherein the optical intensity modulator comprises a dual-armed Z-cut interferometer type optical intensity modulator.

5. An optical transmission apparatus as claimed in claim 1, wherein the differential encoder comprises:
   a power splitter that splits a power level of the input electric signal;
   a delay element which delays one of the split power signals by predetermined bits; and
   a power combiner that synthesizes the split power signals.

6. An optical transmission apparatus as claimed in claim 1, wherein the duobinary filter comprises a low pass filter having a bandwidth corresponding to about ¼ of a data transmission speed.

7. An transmission apparatus as claimed in claim 6, wherein the duobinary optical signal has a transmission characteristic that can be adjusted by regulating the bandwidth of the low pass filter.

8. An optical transmission apparatus as claimed in claim 1, wherein the light source comprises a semiconductor laser.

9. An optical transmission apparatus comprising:
   a differential encoder that encodes an input electric signal;
   a duobinary filter that converts the encoded 2-level electric signal into a 3-level signal;
   a light source that generates light having a continuous wave;
   a polarizer that adjusts a polarization of the light from the light source;
   a Mach-Zehnder modulator that receives first and second separated light input from the polarizer, the Mach-Zehnder modulator including an upper arm and a lower arm, the upper arm modulating a polarization of the first separated light based upon the 3-level duobinary signal input from the duobinary filter, the lower arm adjusting a phase of the second separated light; and a faraday rotator that matches a polarization axis of the light input to the lower arm of the Mach-Zehnder modulator with an electro-optic effect axis of the Mach-Zehnder modulator.

10. An optical transmission apparatus as claimed in claim 9, further comprising an operation amplifier that drives the duobinary filter.

11. An optical transmission apparatus as claimed in claim 9, wherein the polarizer is slanted about 45 degrees with respect to an electro-optic effect axis of the Mach-Zehnder modulator.

12. An optical transmission apparatus as claimed in claim 9, wherein the differential encoder comprises:

a power splitter that splits a power level of the input electric signal;

a delay element that delays one of the split power signals by a predetermined number of bits; and a power combiner that synthesizes the split power signals.

13. An optical transmission apparatus as claimed in claim 9, wherein the duobinary filter comprises a low pass filter having a bandwidth smaller than that of the input electric signal.

* * * * *